July 17, 1923.

J. H. EGGERS, JR 1,461,769

CAR COUPLING

Filed June 29, 1921

Inventor
J. H. Eggers, Jr.

By Lacey & Lacey, Attorneys

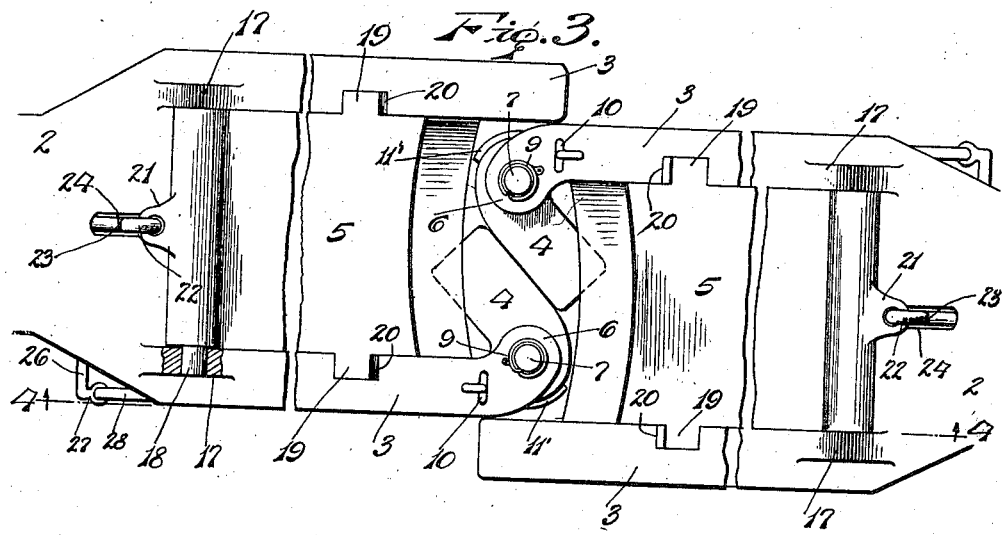
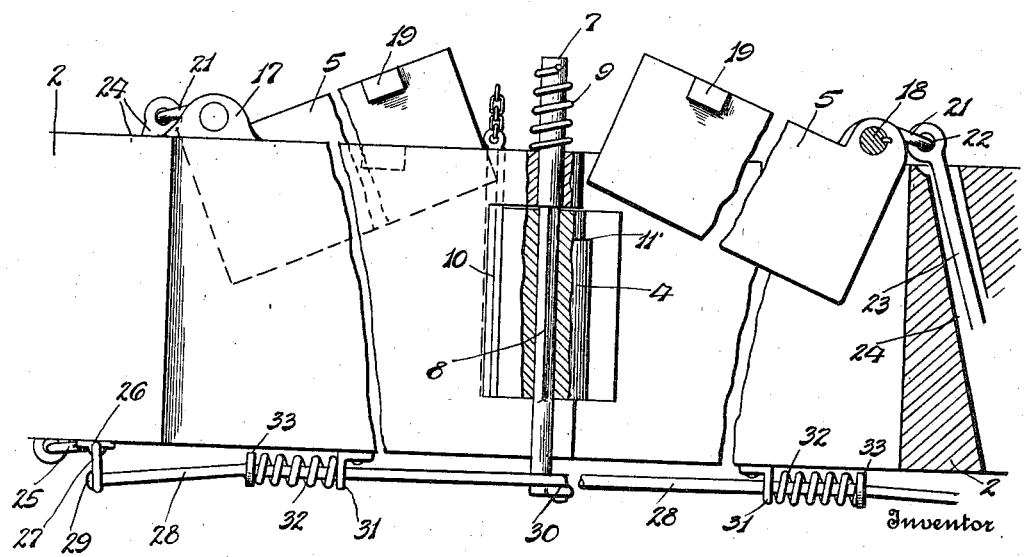

July 17, 1923.

J. H. EGGERS, JR 1,461,769

CAR COUPLING

Filed June 29, 1921

Inventor
J. H. Eggers, Jr.

By
Lacey & Lacey, Attorneys

Patented July 17, 1923.

1,461,769

UNITED STATES PATENT OFFICE.

JOHN H. EGGERS, JR., OF HUNTINGBURG, INDIANA.

CAR COUPLING.

Application filed June 29, 1921. Serial No. 481,369.

*To all whom it may concern:*

Be it known that I, JOHN H. EGGERS, Jr., a citizen of the United States, residing at Huntingburg, in the county of Dubois and State of Indiana, have invented certain new and useful Improvements in Car Couplings, of which the following is a specification.

This invention relates to car couplings and has for its object the provision of a coupling by the use of which two cars may be coupled without any effort on the part of the attendant and whether the knuckles are both in open position or both in closed position or one open and one closed. The invention seeks to provide a coupling in which, as the draw heads come together, the knuckles may move past each other and then assume the coupling relation, means being provided to hold the knuckles in coupled relation and which means will be moved out of the way of the knuckles as the draw heads come together so that the knuckles may operate freely to clear each other and then move into the coupled position. Other objects of the invention will appear in the course of the following description and the invention resides in certain novel features which will be particularly pointed out in the appended claim.

In the accompanying drawings which fully illustrate my invention—

Fig. 3 is a similar view showing the position of the knuckles immediately after the initial impact;

Fig. 5 is a view, partly in side elevation and partly in vertical section, of two drawheads coupled together;

Figure 1:
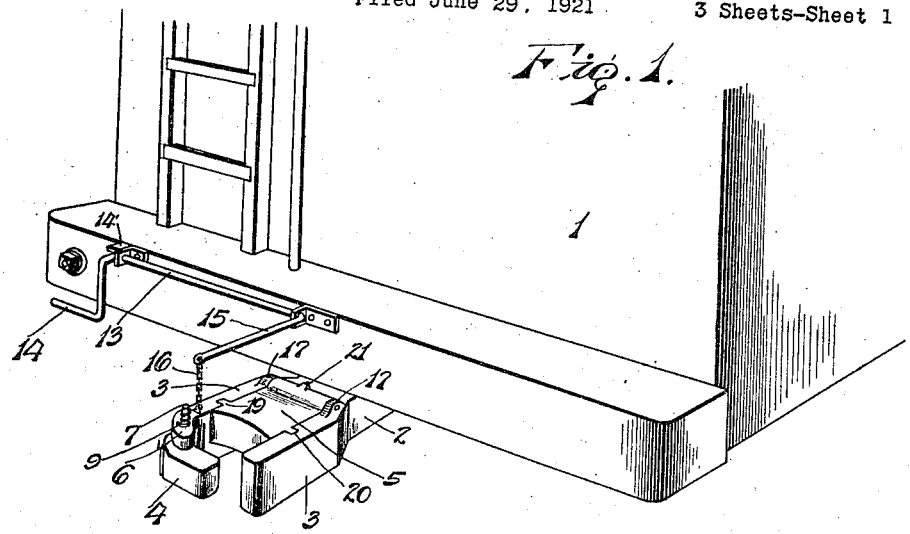
Figure 1 is a perspective view of one end of a freight car having my improved coupler applied thereto.

While the car 1 is illustrated as a freight car, it is to be understood that the coupling is adapted for use upon passenger cars as well as freight cars. The drawhead 2 is mounted on the under side of the car at the end thereof in the usual manner and is constructed with forwardly projecting side arms 3, one of which carries the knuckle 4 and between which is disposed the locking block or head 5. One side arm 3 has its extremity curved slightly inwardly, as shown at 6, and forked or bifurcated to receive the knuckle 4, as clearly shown in Fig. 1, the knuckle being a substantially oblong block pivotally mounted between the branches of the bifurcation for movement in a horizontal plane. The pivot pin 7 has cylindrical ends rotatably fitting within the ends of the bifurcation and an intermediate angular portion 8 which engages an angular bore or opening through the inner end of the knuckle, and a spring 9 is coiled around the upper end of the said pin and has its ends secured respectively to the pin and to the top of the drawhead so that the tendency of the spring to unwind or uncoil serves to move the knuckle toward the open or uncoupled position. To prevent the knuckle moving to open position when cars are coupled together and also to permit the uncoupling of cars, when desired, I provide a locking member consisting of a knuckle lock 10 disposed vertically at the rear of the knuckle and immediately adjacent the same so as to be engaged by the flat face 11 of the knuckle when the cars are coupled. This locking member 10 is slidable vertically through an opening 12 in the upper side of the side arm 3 and may be withdrawn by manipulating a rock shaft 13 which is mounted upon the end of the car and equipped at its outer end with an operating handle or crank 14 and at its inner end with a forwardly projecting crank 15, the free end of which is connected with the upper end of the lock 10 by a chain or other flexible connection 16. A stop projection 14' is provided to limit the upward throw of the handle 14 and thereby prevent complete withdrawal of the lock 10. When said lock is raised, it is supported by a shoulder 11' at the upper end of the face 11 and will rest on said shoulder as long as the knuckle is in uncoupled position.

Upon the upper side of the drawhead, at the inner ends of the side arms 3, I provide the bearing lugs 17 and in the said lugs I journal a rock shaft 18 which carries the locking head or block 5. The said locking head or block 5 substantially fills the space between the side arms 3 and is provided upon its sides with lugs 19 adapted to seat in notches or recesses 20 in the side arms so that the block or head will be prevented from dropping below its operative position and the strain upon the rock shaft 18 will be minimized. Extending rearwardly from the locking head or block at the center thereof is a lug 21 in which is engaged an eye 22 at the upper end of a link 23 which passes downwardly through an opening 24 in the drawhead and has its lower end engaged with a crank 25 extending rearwardly from a rock shaft 26 journaled in suitable bearings upon the under side of the drawhead. The said rock shaft 26 is provided at its outer end with a crank 27 and in the lower end of said crank is loosely engaged a connecting rod 28 provided with a head 29 in rear of the crank so that while the said connecting rod may move rearwardly through the crank without imparting motion thereto, forward movement of the connecting rod will act upon the crank to rock the shaft 26 and thereby exert a pull through the link 23 upon the head or locking block 5 to swing the latter upwardly, as shown in Fig. 5. The front end of the connecting rod 28 is pivotally engaged in an outwardly projecting crank 30 at the lower end of the pivot pin 7 and the intermediate portion of the said rod is supported by a bearing bracket 31 on the under side of the drawhead. A spring 32 is coiled around the connecting rod in rear of the said bracket 31 and bears against the said bracket and against an abutment or shoulder 33 on the rod so that the spring, by its expansion, tends to hold the rod in its rear position and thereby cooperates with the spring 9 to hold the knuckle normally in open or uncoupled position.

The crank 30, in the illustrated arrangement, projects outwardly from the pivot pin 7 but it may project inwardly in which event the crank 27 would extend normally upwardly instead of downwardly. It will, of course, be understood that the crank is secured on the pin after the latter is inserted downwardly through the side arm and the knuckle.

Figure 2:
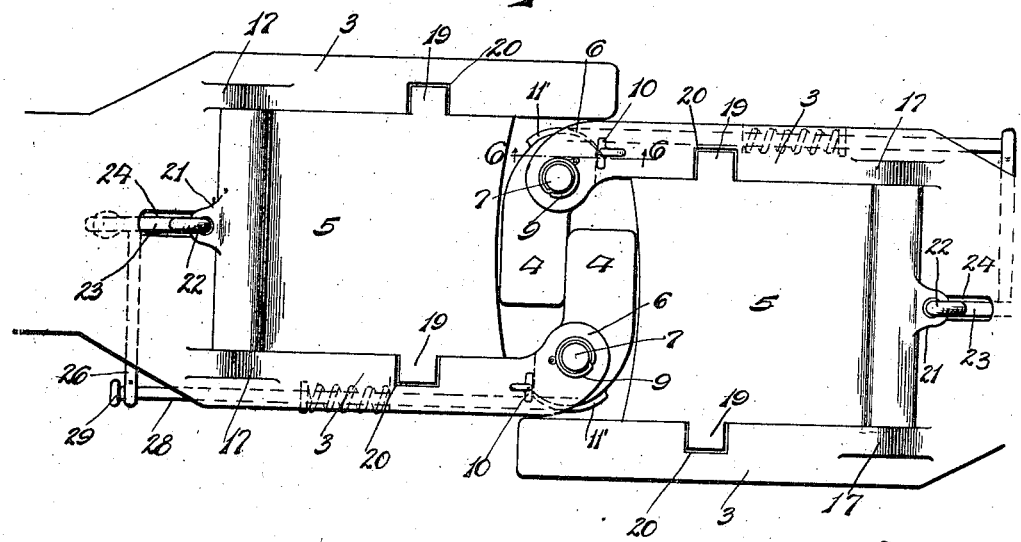
Fig. 2 is an enlarged plan view showing two couplers in the coupled position.
Figure 4:
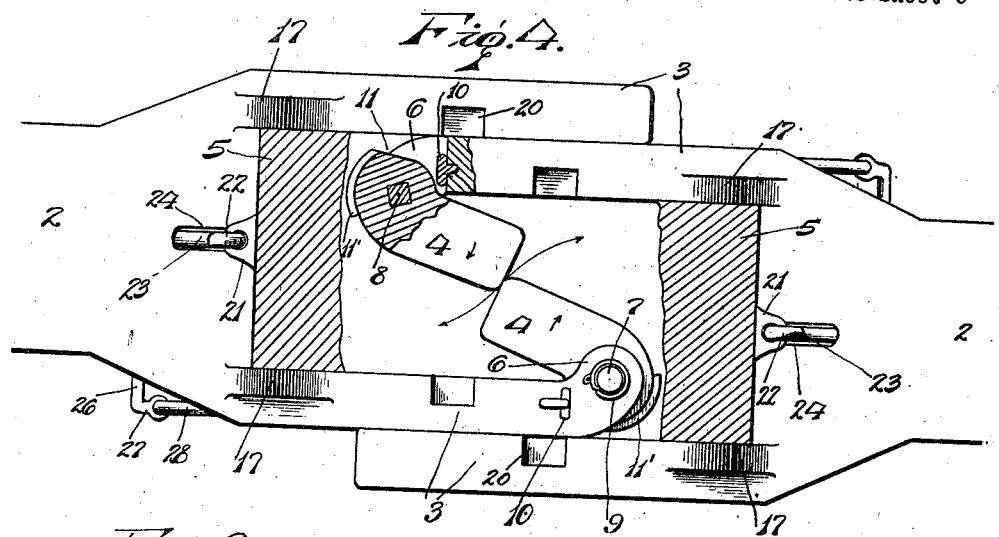
Fig. 4 is a plan view with parts broken away and in horizontal section showing the knuckles in an intermediate position and illustrating the manner in which they clear each other prior to the final step of the coupling operation.
Figure 6:
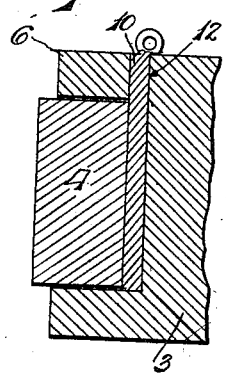
Fig. 6 is a detail vertical section on the line 6—6 of Fig. 2.

It will be readily noted upon reference to the drawings that the flat face 11 at the inner end of the knuckle is disposed normally in rear of the pivot and eccentric thereto so that, when the lock 10 is lowered, the engagement between the face 11 and the said lock will limit the movement of the knuckle under the influence of the springs 9 and 32 so that the knuckle will extend transversely to the drawhead and at a right angle to the side of the same, as shown in Fig. 2. When two drawheads come together in the act of coupling, the lock pin having been withdrawn, the outer sides or edges of the knuckles upon the drawheads will impinge against each other, as will be readily understood upon reference to Fig. 3, and the impact will cause the said knuckles to swing toward the rear of their respective drawheads, as shown in said figure, thereby increasing the tension of the springs 9 and causing the cranks 30 to swing outwardly or toward the front ends of their respective drawheads. The connecting rods 28 will be thereby drawn forwardly and the shaft 26 rocked so that the locking heads or blocks 5 will be raised, as shown in Fig. 5 and hereinbefore described. The said locking heads or blocks will thus be lifted from the path of movement of the knuckles which may swing under the said heads or blocks, as indicated in Fig. 3, and the continued movement of the drawheads will carry the knuckles past each other to the position shown in Fig. 4. When the knuckles reach the position shown in Fig. 4, the springs 9 and 32 will be free to act and will then swing the knuckles to their respective normal transverse positions and each knuckle will assume a position in rear of the other knuckle and in advance of the locking block in the opposed drawhead. This relative outward movement of the knuckles will, of course, effect rearward movement of the respective connecting rods 28 and the rock shafts 26 will then be free to return to their normal positions under the influence of gravity acting upon the relatively heavy locking heads or blocks 5. Said heads or blocks will then return to the position shown in Fig. 2 and will cooperate with the locks 10 to prevent the knuckles moving to uncoupled position. It will be understood that the power moving the cars toward each other is cut-off at the moment of impact, and the slight reaction or jolt imparted to the standing car by the impact will move the cars slightly in a direction away from each other and thereby permit the knuckles to come into coupled engagement and permit the locking blocks 5 to drop into position in rear of the knuckles upon the respectively opposed drawheads, each knuckle lying between the knuckle and locking head of the coupled drawhead. If it be desired to uncouple the cars, the brakeman will manipulate the handle or crank 14 to rock the shaft 13 and lift the lock 10 so that, if the cars be then moved apart, the released knuckle may swing outwardly with respect to the drawhead to which it is pivoted and rearwardly with respect to the opposed drawhead, the drawheads swinging laterally upon their connections with the cars to permit the free ends of the knuckles to pass each other. If the locks 10 on both couplers be released, the knuckles will pass more easily. It will thus be seen that I have provided a very simple construction whereby two cars may be automatically coupled whatever may be the positions of the knuckles upon the respective drawheads. It will be understood that the spring 9 or the spring 32 may be omitted as they exercise the same function, but I prefer to employ both springs as weaker springs may then be used and also because the device will not become entirely inoperative if one spring should be broken. My improved coupling renders it unnecessary for the brakeman to pass between the cars to set the knuckle for the coupling operation and thereby eliminates danger to life and limb.

Figure 7:
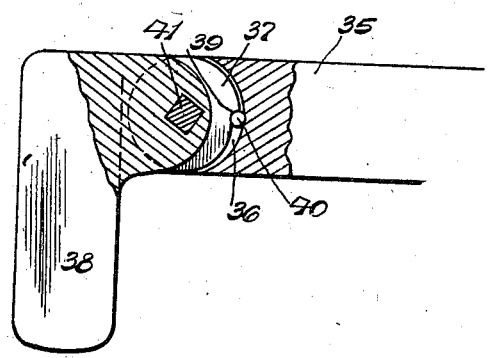
Fig. 7 is a view, partly in plan and partly in horizontal section, of another form of knuckle and pivotal mounting for the same.
Figure 8:
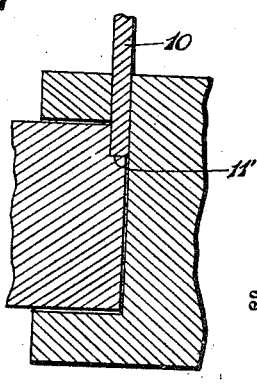
Fig. 8 is a detail section similar to Fig. 6 but showing the parts in another position.

In the preferred embodiment of my invention which has been described, the pivot pin is disposed inwardly with respect to the side arm of the drawhead but this location is not essential and in Fig. 7 I have shown the side arms having their terminals within the longitudinal planes of the arms and the knuckles are constructed with offsets which extend rearwardly or inwardly to carry the respective pivot pins. In Fig. 7, the side arm 35 is constructed with a horizontally disposed notch or recess 36 which receives the circular or arcuate tongue 37 on the knuckle 38, the said tongue 37 being provided with a shoulder 39 adapted to engage a locking pin 40 which is inserted vertically through the side arm and is removable in the same manner as the locking pin 10 in the first described form of the invention is removable. The pivot pin 41 is of the same construction as the pivot pin 7 and operates in the same manner. The locking pin 40 by its engagement with the shoulder 39 limits the movement of the knuckle toward the uncoupled position but when it is desired to uncouple the cars, the pin may be raised out of engagement with the shoulder and the knuckle may then swing to the uncoupled position, as will be readily understood.

Having thus described the invention, what is claimed as new is:

A car coupling comprising a drawhead, a knuckle pivotally mounted at the end of the drawhead at one side of the same, yieldable means holding the knuckle normally in uncoupled position, a locking head pivotally mounted upon the drawhead at the rear of the knuckle and normally supported by the drawhead in the path of an opposed knuckle, a rock shaft mounted on the under side of the drawhead, connections between said rock shaft and the locking head, and connections between the said rock shaft and the knuckle whereby inward movement of the knuckle will raise the locking head to permit the coupling operation.

In testimony whereof I affix my signature.

JOHN H. EGGERS, Jr. [L. S.]